J. M. FITZ GERALD.
MONORAIL TRUCK.
APPLICATION FILED JUNE 1, 1920.
1,370,526. Patented Mar. 8, 1921.
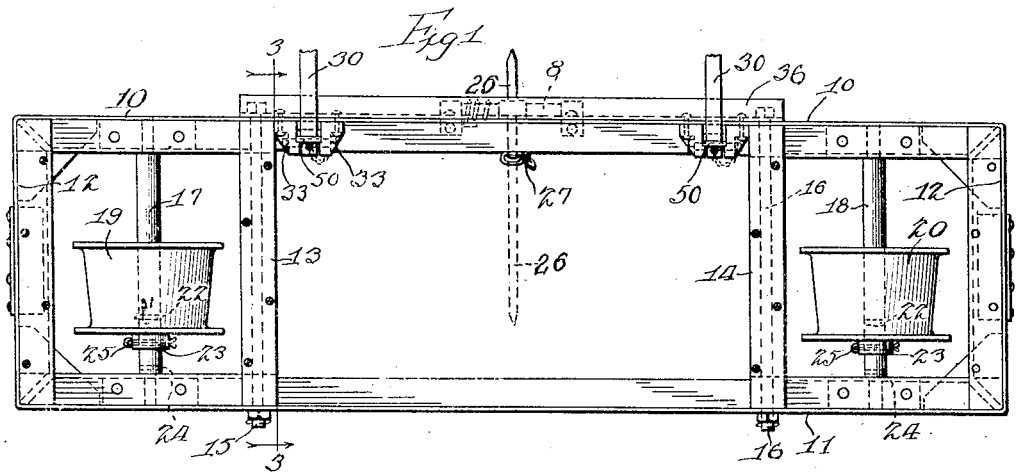
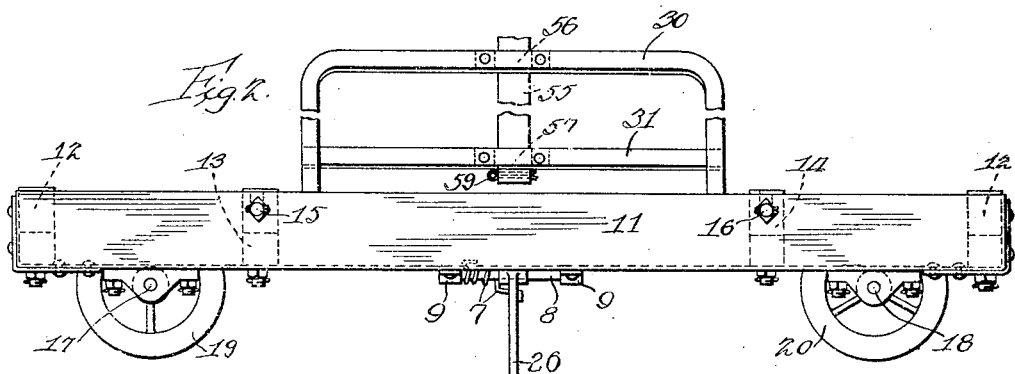
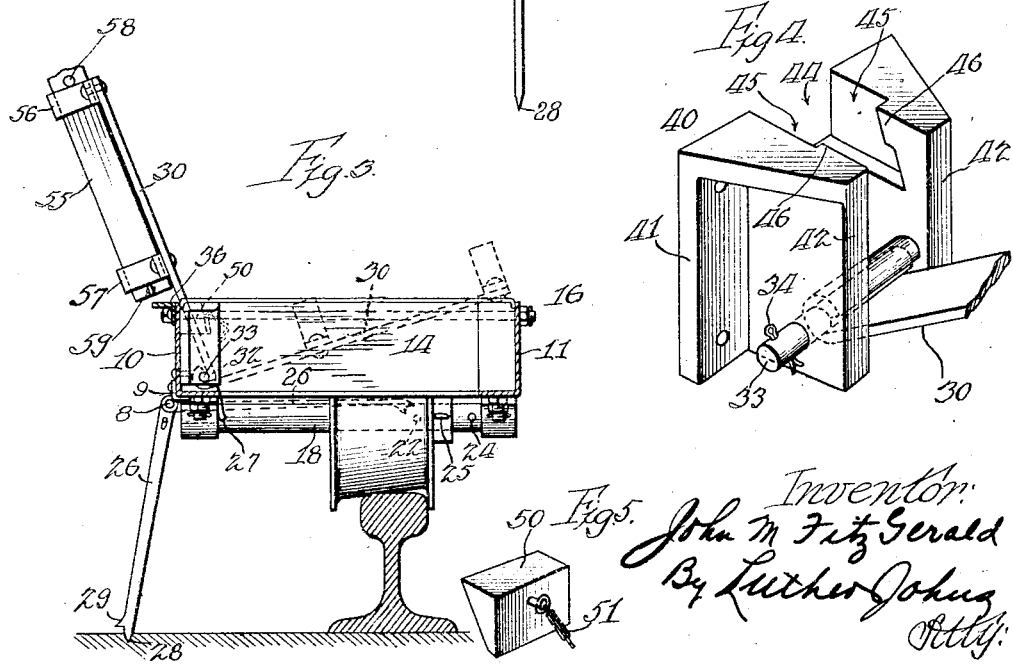
Inventor:
John M Fitz Gerald
By Luther Johns
Atty.

UNITED STATES PATENT OFFICE.

JOHN M. FITZ GERALD, OF RIVER FOREST, ILLINOIS.

MONORAIL-TRUCK.

1,370,526.           Specification of Letters Patent.        Patented Mar. 8, 1921.

Application filed June 1, 1920. Serial No. 385,457.

*To all whom it may concern:*

Be it known that I, JOHN M. FITZ GERALD, a citizen of the United States, residing at River Forest, in the county of Cook and State of Illinois, have invented certain new and useful Improvements in Monorail-Trucks, of which the following is a specification.

My invention relates to trucks or hand-cars designed to travel upon a single rail. Its general object is to provide for greater ease and facility, with a consequent saving of time and labor in the handling of the device over that of other trucks of this class heretofore known. Other objects and advantages will appear hereinafter.

Trucks of the present type are used by railroad employees for transporting rails, ties and other equipment or supplies from one place to another along the right-of-way, as in making repairs. These cars are relatively narrow and the load is approximately balanced so that the car may be propelled by pushing and steadying the same by hand. Ordinarily one man is required to hold the car steady while others apply the load. In order that a considerable load of bulky articles such as ties can be carried such cars are provided with an upwardly and outwardly extending load-supporting side frame or bracket which heretofore, so far as I am aware, has always been rigidly carried in its operative position by the main frame of the device, rendering the truck unwieldy in handling and making it occupy unnecessarily large space in storage.

Specific features of improvement herein disclosed are the provision of a load-supporting side frame which may be moved into an out-of-the-way position for handling or for storage purposes; another being the provision of means for adjusting the body of the truck with respect to the wheels on the track so that the device may be readily adapted to receive a bulky load, for instance boxes, which would project beyond the free side of the truck frame or which could not be arranged upward along the load-supporting side frame, in which case the load may be substanitally balanced by shifting the truck frame relative to the wheels; another improvement being in the provision of a leg or support for holding the truck in operative position while being loaded, the leg being readily movable into its holding position, readily releasable for automatic movements out of the holding position, and being adapted for movement into another out-of-the-way position for handling or storage.

In the accompanying drawings, which form a part of this specification, Figure 1 is a top plan and Fig. 2 is a fragmentary side elevation of my improved truck; Fig. 3 is a vertical transverse section on the line 3—3 of Fig. 1; Fig. 4 is an enlarged perspective of one of the two brackets for hinging the side frame to the main frame; and Fig. 5 is an enlarged perspective of the wedge used with the bracket of Fig. 4.

My improved truck is shown as having a rectangular frame comprising side members 10 and 11 and end members 12 made of angle iron with wooden bars at the end portion of the frame as shown. There are also two thwarts or intermediate cross pieces 13 and 14 made of wood which are longitudinally recessed at the top to receive the cross bolts 15 and 16. The top surfaces of the transverse wooden frame parts are covered with strap iron held in place by screws. The frame may be according to any approved construction.

To the side members of the main frame are secured, as by bolts, bearing brackets carrying the ends of the axles 17 and 18, and on these axles are mounted the peripherally grooved wheels 19 and 20 respectively which are arranged tandem and adapted to travel upon one rail of the track. It is common practice to mount such wheels in this manner upon a suitable frame.

The axles 17 and 18 are bored through diametrically at various places as 22, 23 and 24 to receive the cotter pin 25 passing through diametric holes in a flange of the wheel, thus holding the wheel in any one of several positions relative to the side members 10 and 11, and thus in a simple way providing for the advantageous feature of preserving the substantial balance of the car in service when carrying loads with centers of gravity respectively at different places laterally with respect to the main frame.

The leg 26 for holding the truck while being loaded has a sharp point at 28 adapted to project into one of the wooden ties supporting the rails, the heel or stop 29 limiting the depth of its movement. The leg is carried rigidly upon the shaft 8 pivotally mounted in spaced-apart brackets 9 riveted to the frame side member 10, and on the shaft 8 is the coiled spring 7 having its one end fastened to a relatively movable part such as the leg 26 and the other end secured to a relatively fixed part such as the frame member 10, the spring being under tension when the leg is in its holding position, shown in Fig. 3 and being adapted to throw the leg upward as soon as released from the tie. In operation, after the workman has pushed the car to the place of loading (the leg 26 having been released from the strap 27 before the car is put upon the rail and the leg extending upward upon the side member 10) the leg is pushed down, against the tension of the spring 7, and made to engage the tie whereupon the car is sufficiently stabilized to permit loading, and in the case of many kinds of articles to be transported the loading may be done by one man. When the workman is ready to propel the car he simply swings the car on the wheels slightly to release the point 28 from the tie and thereupon the leg automatically swings upward into one of its two out-of-the-way positions. For handling and storage purposes the leg 26 may be swung into its dotted line position shown in Fig. 3, against the tension of the spring 7, and secured by conveniently operated means such as the strap 27. By placing the point 28 of the leg 26 nearer to or farther from the rail the inclination of the main frame of the device may be varied with respect to the rail, and in the case of higher or lower rails the usually desired horizontal position of the main frame may be maintained in loading or when the device is otherwise at rest. The leg 26 also locks the truck against longitudinal movement.

The load-supporting side frame structure includes a metallic bail or substantially U-shaped member 30 and a tie member 31. Each end of the bail 30 is turned with an eye at 32, well seen in dotted lines in Fig. 3, and through each eye passes a headed pin 33 held in position in the bracket 40 by a cotter pin 34.

The brackets 40 are riveted to the main member 10 and are shown as castings. Each bracket has a rear wall 41, and a pair of forward extensions 42 which are spaced apart a little more than the width of the side frame part 30 so that this part 30 may move freely between the extensions on the pin 33. A cotter pin 34 holds the pin 33 against withdrawal except when it is desired to remove the side frame bodily from the device, it being pointed out that frequently, depending upon the character of the load, it is highly advantageous to remove the side frame as a unit from the rest of the device. The rear wall 41 is cut away at 44 and in service the frame part 30 rests against the upper edge portion of the channel iron 10, as is well seen in Fig. 3, and the upper edge portion of the side frame 10 is strongly reinforced by the channel 36. The extensions 42 of each bracket 40 are recessed at 45 to provide a pair of oppositely disposed shoulders at 46 whereby when the load-carrying side frame is in its upwardly and laterally extending position shown in Fig. 3 the wedge 50 inserted between the frame 30 and the stops or shoulders 46 in each bracket will hold the load-supporting side frame rigidly in its operative position. When it is desired to lower the side frame into its dotted line position shown in Fig. 3 these wedges 50 are simply lifted out of the brackets 40 respectively, allowing the frame members 30 to swing freely between the extensions 42 of this holding bracket 40. In order that the wedge 50 may not become lost I secure to it a chain 51, the other end of which is fastened to the main frame part 10.

The device is normally propelled by means of a rod or handle bar 55 which is carried by the load-supporting side frame in a pair of spaced-apart brackets 56 and 57 made of strap iron and forming eyes through which the handle 55 extends, the strap 56 being riveted to the frame part 30 while the strap 57 is riveted to the frame part 31. A cross rod or pin 58 carried by the handle 55 constitutes a stop for limiting the movement of the handle in one direction, while the cotter pin 59 passing through a hole in the end of the handle 55 prevents retraction of the handle when in service while permitting it readily to be withdrawn when it is desired to collapse the several parts into relatively small compass, as for storing.

While I have thus illustrated and described a preferred and highly advantageous arrangement and construction, I contemplate as being within the scope of these improvements such changes and departures from what is specifically set forth herein as fall within the scope of the appended claims.

I claim:

1. In a mono-rail truck of the class described, the combination of a main body frame, wheels mounted tandem therein, a normally upwardly inclined load-supporting side frame extending from the body frame and mounted thereon for movement out of its operative position into an out-of-the-way position, and means for holding the side frame in its operative position.

2. In a mono-rail truck of the class described, the combination of a main body frame, wheels mounted tandem therein, a normally upwardly inclined load-supporting side frame extending from the body frame and mounted thereon for movement out of its operative position into an out-of-the-way position, means for holding the side frame in its operative position, and a handle on the side frame for propelling the truck.

3. In a mono-rail truck of the class described, the combination of a main body frame, wheels mounted tandem therein, a normally upwardly inclined load-supporting side frame extending from the body frame and mounted thereon for movement out of its operative position into an out-of-the-way position, means for holding the side frame in its operative position, and a handle readily removably mounted on the side frame for propelling the truck.

4. In a mono-rail truck of the class described, the combination of a main body frame, wheels mounted tandem therein, a normally upwardly and laterally inclined load-supporting side frame extending from the body frame and hingedly mounted thereon to swing downward into an out-of-the-way position close to the body frame, and means for holding the side frame in its normal position.

5. In a mono-rail truck of the class described, the combination of a main body frame, wheels mounted tandem therein, a normally upwardly and laterally inclined load-supporting side frame extending from the body frame and hingedly mounted thereon to swing downward into an out-of-the-way position close to the body frame, means for holding the side frame in its normal position, and a handle on the side frame for propelling the truck.

6. In a mono-rail truck of the class described, the combination of a main body frame, wheels mounted tandem therein, a normally upwardly and laterally inclined load-supporting side frame extending from the body frame and hingedly mounted thereon to swing downward into an out-of-the-way position close to the body frame, means for holding the side frame in its normal position, and a readily removable handle on the device for propelling the truck.

7. In a mono-rail device of the class described, the combination of a frame, wheels mounted tandem therein, and means for holding the frame in various positions of lateral adjustment with respect to the wheels.

8. In a mono-rail device of the class described, the combination of a frame, spaced apart transverse axles carried by the frame, wheels mounted tandem on said axles, and means for holding the wheels tandem at various corresponding places on the axles respectively so as to adjust the frame laterally relative to the wheels.

9. In a mono-rail device of the class described, the combination of a frame, wheels mounted tandem therein, and a bar-like frame-supporting leg pivotally mounted on the frame and extending downward from the frame laterally of the line of travel of the wheels, said leg being mounted to move only in a plane substantially at right angles to the line of travel of the device.

10. In a mono-rail device of the class described, the combination of a frame, wheels mounted tandem therein, a movably mounted frame-supporting leg carried by the device and extending downward laterally of the line of travel of the wheels, and spring means for automatically throwing the leg into an out-of-the-way position when released from its frame-supporting position.

11. In a mono-rail device of the class described, the combination of a frame, wheels mounted tandem therein, a frame-supporting leg pivotally mounted on the device so as to swing upward into an out-of-the-way position from its frame-supporting position, and means for holding the leg in said out-of-the-way position.

12. In a mono-rail device of the class described, the combination of a frame, wheels mounted tandem therein, a frame-supporting leg pivotally mounted on the device so as to swing upward into an out-of-the-way position laterally of the frame and to swing into another out-of-the-way position in the reverse direction of movement, and means for holding the leg in each of said out-of-the-way positions.

13. In a mono-rail truck of the class described, the combination of a main body frame, wheels mounted tandem therein, a load-supporting side frame normally extending in its operative position upwardly and outwardly from the main frame, a propelling handle on the side frame, and means for holding the side frame in its normal position in readily removable relation to the main frame.

JOHN M. FITZ GERALD.